(12) United States Patent
Uehara et al.

(10) Patent No.: US 8,441,547 B2
(45) Date of Patent: *May 14, 2013

(54) DIGITAL STILL CAMERA

(75) Inventors: Ryo Uehara, Yokohama (JP); Koichiro Kawamura, Ichihara (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/064,588

(22) Filed: Apr. 1, 2011

(65) Prior Publication Data

US 2011/0181755 A1    Jul. 28, 2011

Related U.S. Application Data

(60) Continuation of application No. 12/654,625, filed on Dec. 28, 2009, now abandoned, which is a continuation of application No. 11/819,993, filed on Jun. 29, 2007, now abandoned, which is a continuation of application No. 10/670,323, filed on Sep. 26, 2003, now abandoned, which is a continuation of application No. 09/748,194, filed on Dec. 27, 2000, now abandoned, which is a division of application No. 08/517,474, filed on Aug. 21, 1995, now Pat. No. 6,292,217.

(30) Foreign Application Priority Data

Feb. 14, 1995  (JP) .................................... 7-025591
Aug. 1, 1995  (JP) .................................... 7-196794

(51) Int. Cl.
    *H04N 5/228*    (2006.01)
(52) U.S. Cl.
    USPC ............... 348/222.1; 348/220.1; 348/333.11

(58) Field of Classification Search ............... 348/222.1, 348/333.01, 333.02, 333.11, 333.12
See application file for complete search history.

(56) References Cited

U.S. PATENT DOCUMENTS

| | | | |
|---|---|---|---|
| 4,420,773 A | 12/1983 | Toyoda et al. |
| 4,456,931 A | 6/1984 | Toyoda et al. |

(Continued)

FOREIGN PATENT DOCUMENTS

| | | |
|---|---|---|
| JP | A-01-233881 | 9/1989 |
| JP | A-03-186073 | 8/1991 |

(Continued)

*Primary Examiner* — Tuan Ho
(74) *Attorney, Agent, or Firm* — Oliff & Berridge, PLC

(57) ABSTRACT

In a digital still camera, when the reproducing mode is selected, an indication to the effect that the operation is in standby for reproduction is displayed on an indicating device, and if the command dial is not operated until 16 seconds elapses after the indication has been started, the supply of source voltage to the various parts of the camera is stopped, to achieve a reduction in power consumption. If the command dial is operated within 16 seconds, image signals are output to an external monitor and also an indication to the effect that reproduction is in progress is displayed on the indicating device. If the command dial has been operated within three minutes after reproduction of a given photographic frame has been started, reproduction of the following frame is performed, but if the command dial has not been operated until the three minutes have elapsed, the indication to the effect that the operation is in standby for reproduction is displayed again. If the sensitivity changeover switch and the command dial are operated together during reproduction or standby for reproduction, the photographic frame to be reproduced is determined in correspondence to the quantity and direction of the rotation of the command dial and the frame number of the frame thus determined is displayed on the indicating device.

16 Claims, 18 Drawing Sheets

U.S. PATENT DOCUMENTS

| | | | |
|---|---|---|---|
| 4,758,883 | A | 7/1988 | Kawahara et al. |
| 4,931,984 | A | 6/1990 | Ny |
| 5,016,107 | A | 5/1991 | Sasson et al. |
| 5,040,068 | A | 8/1991 | Parulski et al. |
| D325,273 | S | 4/1992 | Ikeda et al. |
| 5,111,299 | A | 5/1992 | Aoki et al. |
| 5,146,353 | A | 9/1992 | Isoguchi et al. |
| 5,164,831 | A | 11/1992 | Kuchta et al. |
| 5,301,015 | A | 4/1994 | Kim |
| 5,424,772 | A | 6/1995 | Aoki et al. |
| 5,448,334 | A | 9/1995 | Kaihara et al. |
| 5,450,129 | A | 9/1995 | Matoba et al. |
| 5,465,133 | A | 11/1995 | Aoki et al. |
| 5,473,370 | A | 12/1995 | Moronaga et al. |
| 5,479,268 | A | 12/1995 | Young et al. |
| 5,485,200 | A | 1/1996 | Shimizu |
| 5,525,957 | A | 6/1996 | Tanaka |
| 5,570,130 | A | 10/1996 | Horii |
| 5,576,758 | A | 11/1996 | Arai et al. |
| 5,874,999 | A | 2/1999 | Suzuki et al. |
| 5,956,084 | A | 9/1999 | Moronaga et al. |
| 6,052,510 | A | 4/2000 | Sakaegi et al. |
| 6,147,708 | A | 11/2000 | Suzuki et al. |
| 6,249,313 | B1 | 6/2001 | Nishi |
| 6,292,217 | B1 | 9/2001 | Uehara et al. |
| 6,351,287 | B1 | 2/2002 | Sakaegi et al. |
| 6,353,488 | B1 | 3/2002 | Hieda et al. |
| 6,407,772 | B2 | 6/2002 | Mizoguchi |
| 6,466,263 | B1 | 10/2002 | Suzuki |

FOREIGN PATENT DOCUMENTS

| | | |
|---|---|---|
| JP | A-03-214665 | 9/1991 |
| JP | A-04-8375 | 1/1992 |
| JP | A-04-135021 | 5/1992 |
| JP | A-04-142170 | 5/1992 |
| JP | A-04-142188 | 5/1992 |
| JP | A-04-151994 | 5/1992 |
| JP | A-04-249487 | 9/1992 |
| JP | A-04-292739 | 10/1992 |
| JP | A-05-037838 | 2/1993 |
| JP | A-05-091455 | 4/1993 |
| JP | A-05-183856 | 7/1993 |
| JP | A-05-197844 | 8/1993 |
| JP | A-05-328297 | 12/1993 |
| JP | A-05-330378 | 12/1993 |
| JP | A-06-054286 | 2/1994 |
| JP | A-06-153034 | 5/1994 |
| JP | A-06-319103 | 11/1994 |
| JP | B2-4384094 | 10/2009 |

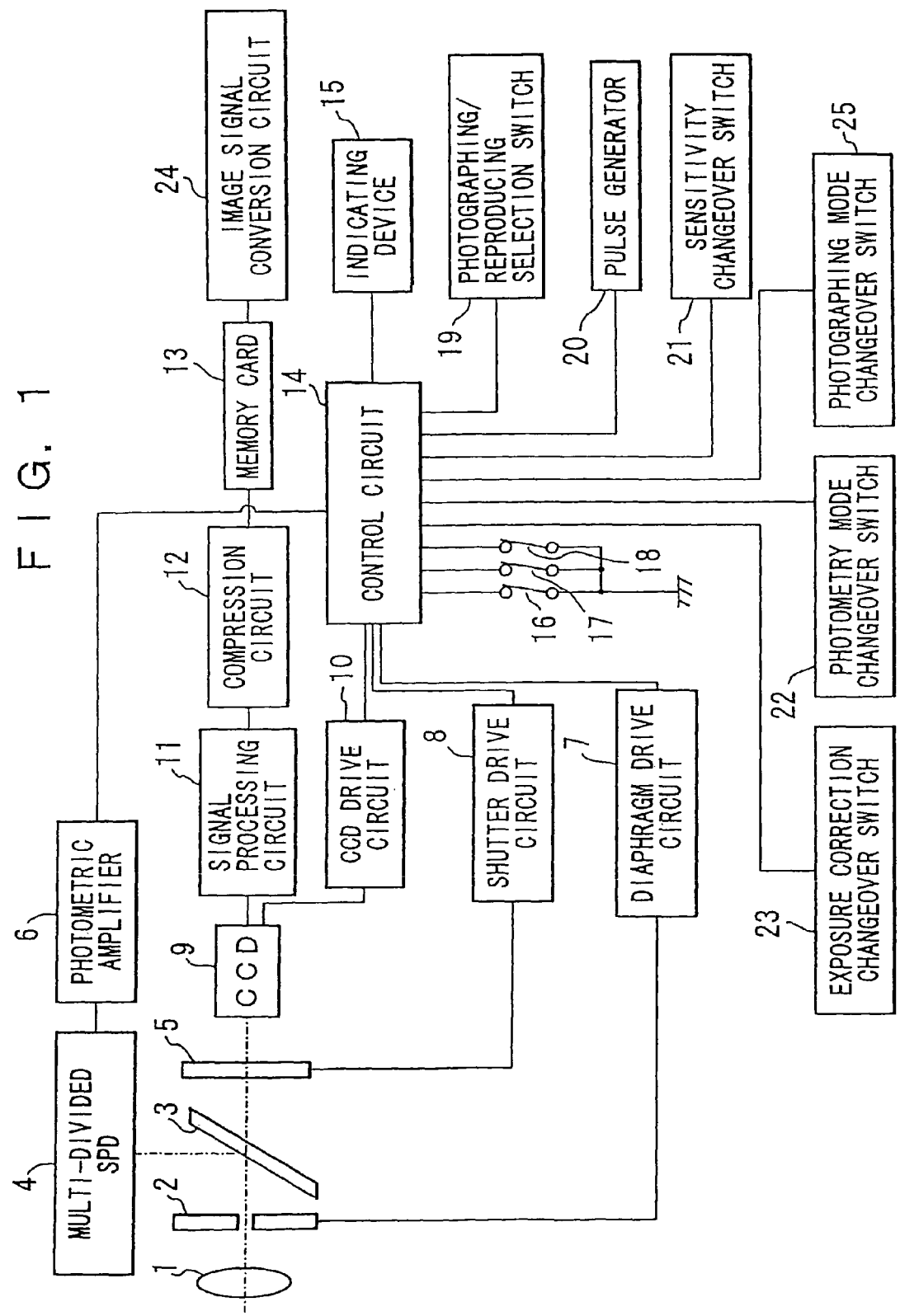

FIG. 3A
FIG. 3B
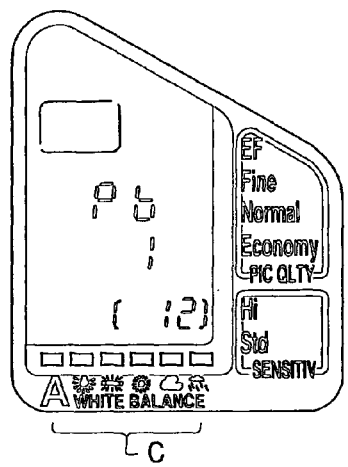
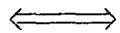
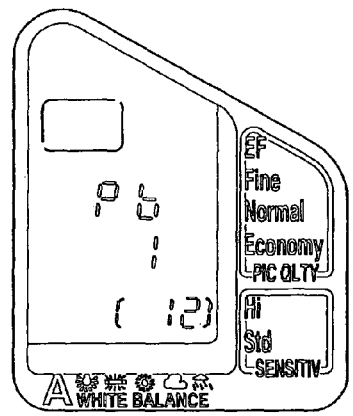

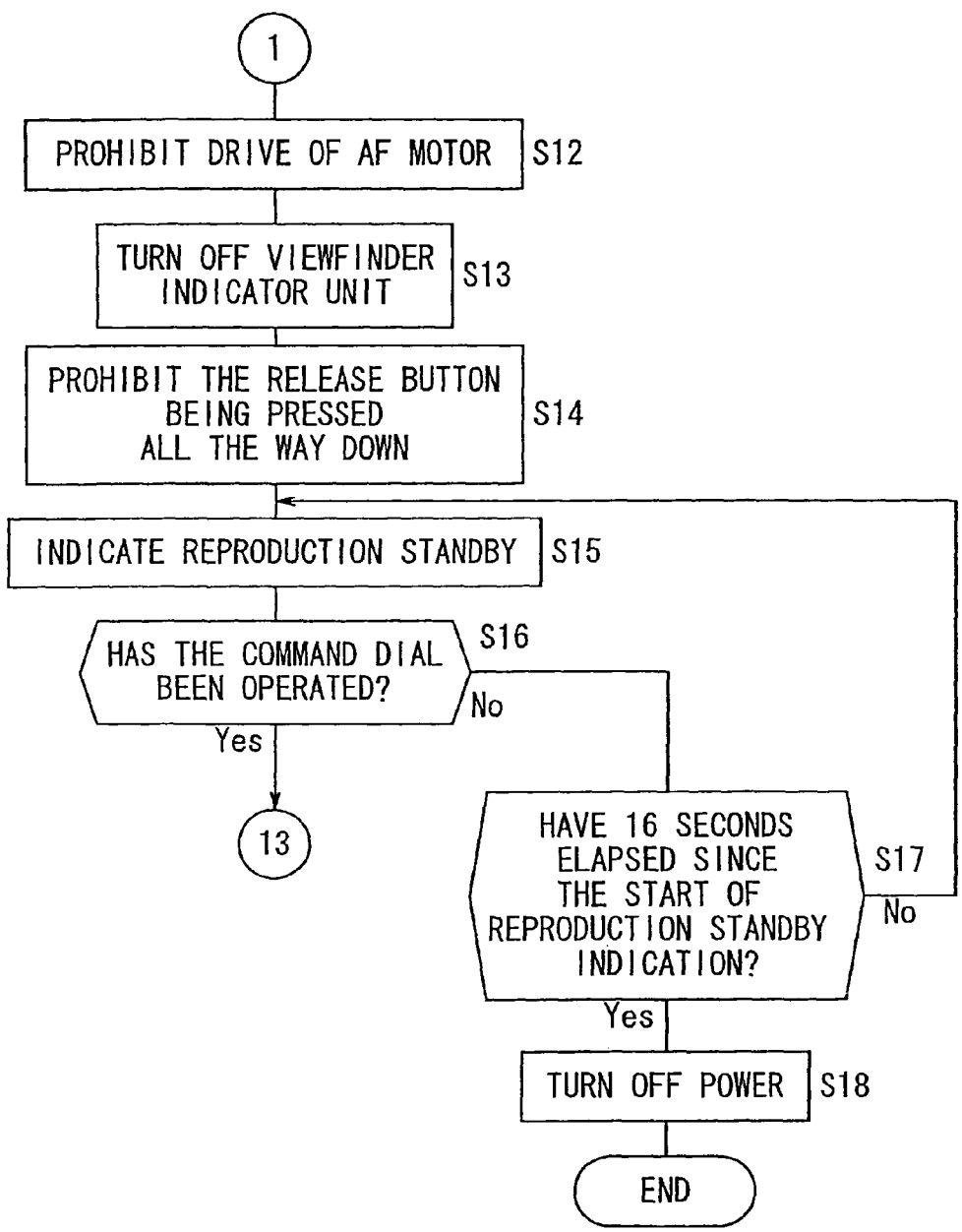

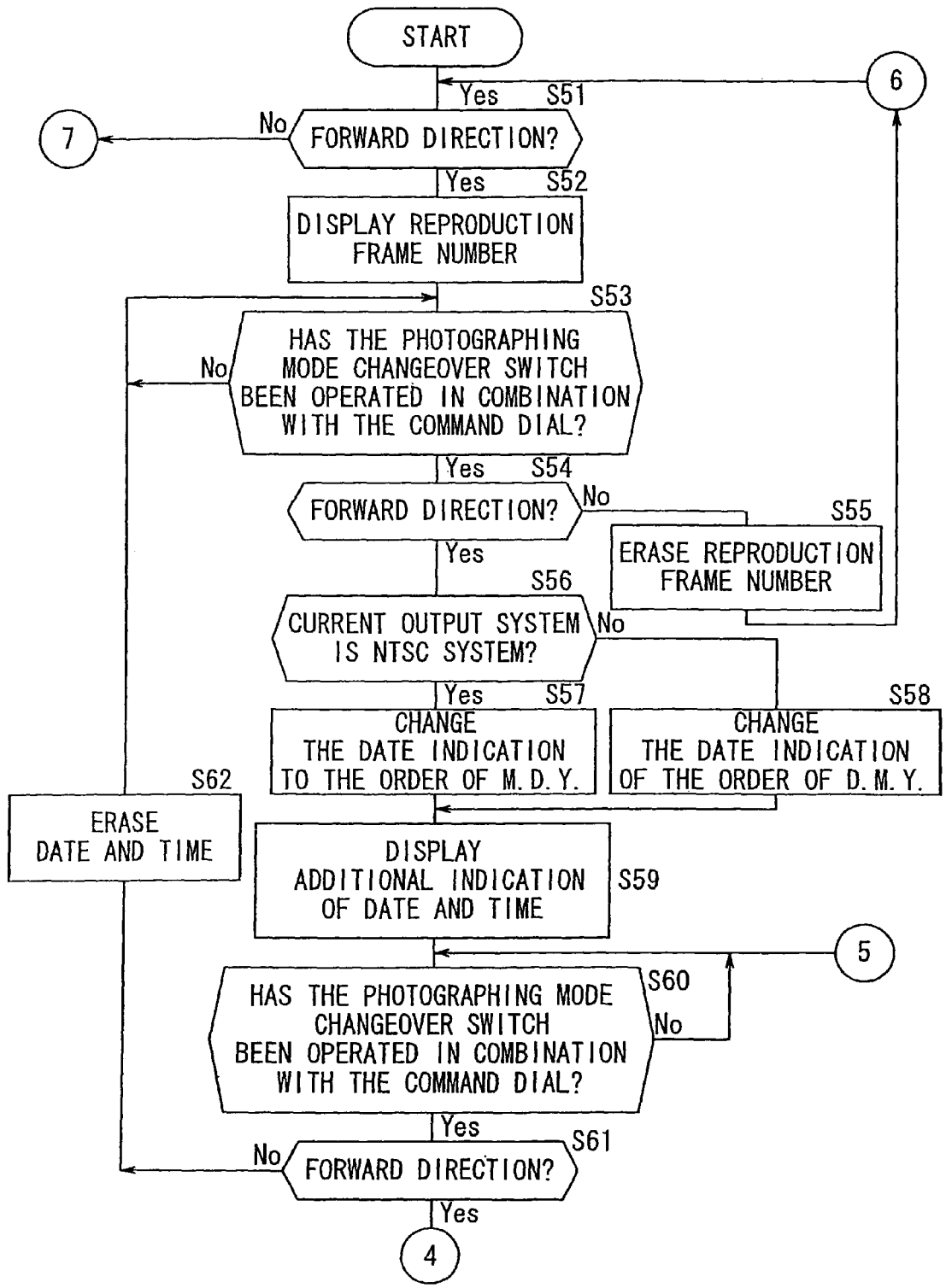

FIG.11A
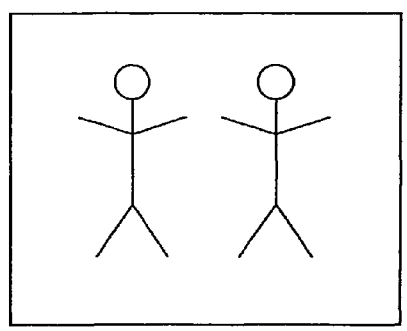
FIG.11B
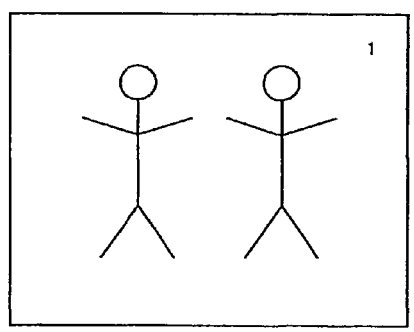
FIG.11D
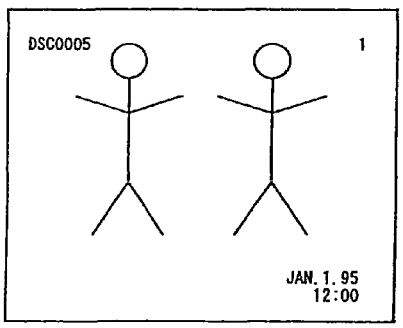
FIG.11C
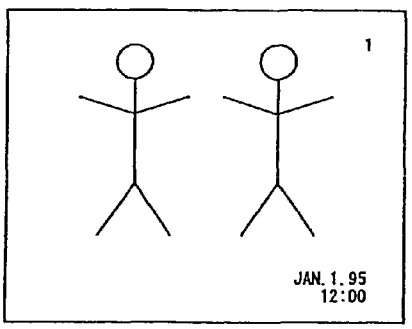

NTSC

PAL

DIGITAL STILL CAMERA

This is a Continuation of U.S. patent application Ser. No. 12/654,625 filed on Dec. 28, 2009, which in turn is a Continuation of U.S. patent application Ser. No. 11/819,993 filed Jun. 29, 2007, which in turn is a Continuation of U.S. patent application Ser. No. 10/670,323 filed Sep. 26, 2003 (now abandoned), which in turn is a Continuation of U.S. patent application Ser. No. 09/748,194 filed Dec. 27, 2000 (now abandoned), which is a Divisional of U.S. patent application Ser. No. 08/517,474 filed Aug. 21, 1995 (now U.S. Pat. No. 6,292,217). The entire disclosure of each of the prior applications is hereby incorporated by reference herein in its entirety.

BACKGROUND OF THE INVENTION

1. Field of the Invention

The present invention relates to a digital still camera that can take up an image and convert the data of the image to digital data to record it on a recording medium, the recorded digital data being able to be reproduced by an external play back device.

2. Related Background Art

A digital still camera picks up the image of a photographic subject by using an imaging element such as a CCD, converts the image data to a digital data, which are the result of photographing, and then records the digital data to a recording medium such as a memory card. The data thus recorded are reproduced by a monitor connected to the camera.

However, the majority of digital still cameras in the prior art are not provided with reproducing functions. Because of this, in order to reproduce the images, a reproducing unit that transfers the digital data from the camera to the monitor must be mounted on the camera main body. Since it is bothersome to attach and detach the reproducing unit each time the photographer switches between photographing and reproduction, many photographers perform photographing with the reproducing unit left attached to the camera main body.

With the reproducing unit mounted, however, the overall weight and bulk of the camera equipment is increased and it becomes too cumbersome to carry around. And the mounted reproducing unit hinders photographing and may cause the photographer to miss good photographing opportunities.

Digital still cameras provided with reproducing functions are also known in the prior art. In this type of camera, in order to miniaturize the camera body, only the minimum required functionality of a normal reproducing unit is usually provided. Because of this, with this type of camera, while the frame number of the frame data that is currently being reproduced can be displayed on an indicator unit of the camera, the total frame number of the photographic data recorded on the memory card cannot be indicated.

In addition, when displaying the data recorded on the memory card on an external monitor, the recorded data must be converted to image signals. Widely known signal processing systems for image signals include the NTSC system and the PAL system. Digital still cameras equipped with reproducing functions in the known art only support one of either the NTSC system or the PAL system. This means that in order to connect a camera that outputs NTSC image signals to a PAL-type monitor, a time-consuming task of converting the image signals output from the camera to PAL type image signals must be completed before they can be input to the monitor.

SUMMARY OF THE INVENTION

The object of the present invention is to provide a digital still camera with which various reproducing functions can be both selected and indicated without adding new operating members by effectively using various operating members that are already provided in the camera body as in prior art. In order to achieve the object described above, the present invention is applied to a digital still camera that comprises a first operating member that can set photography-related information, an indicating device that can indicate photography-related information, an imaging device that outputs image data corresponding to the image of a photographic subject that has been picked up, a recording device that converts image data to digital data and records them to a recording medium and an image signal conversion circuit that converts the recorded digital data to image signals, and can output converted image signals to an external monitor. It further comprises a selecting member that can select either a photographing mode for performing photographing or a reproducing mode for performing reproduction, and a control circuit that, when the operation is switched from the photographing mode to the reproducing mode by the selecting member, causes the indicating device to display a first indication to the effect that the operation is in standby for the reproduction, and that when the first operating member is operated while the first indication is being displayed, outputs image signals to the monitor and causes the indicating device to display a second indication to the effect that reproduction is in progress.

With the digital still camera according to the present invention, since the reproduction standby status and the reproducing status are switched by operating the first operating member, which is originally provided to set the photography-related information, the reproducing functions can be selected without providing an additional operating member. Consequently, without new reproducing functions added, the camera body of a camera in the prior art can be used as is, achieving a cost reduction. Moreover, since the indication format on the indicating device of the camera is changed depending upon whether the operation is in the reproduction standby state or the reproducing state, it is possible to verify whether or not reproduction is currently in progress by the indication on the indicating device.

The present invention is also applied to a digital still camera comprising an imaging device that outputs image data corresponding to the image of a photographic subject which has been picked up and a recording device that converts image data to digital data and records them to a recording medium. The camera is further provided with an image signal conversion circuit that converts recorded digital data to image signals, an output circuit that outputs the image signals and photography-related information related to the image signals to an external monitor in a specific signal processing system and a photography-related information changing circuit that changes part of, or the whole of the photography-related information to be output to the monitor in correspondence to the signal processing system that is set in advance on the monitor.

Since the digital still camera according to the present invention changes part of, or all the photography-related information in correspondence to the signal type that is set in advance on the monitor, to display it on the monitor, the photography-related information can be displayed in a display format that is compatible with the signal processing system. Furthermore, by just looking at the photography-related information on the monitor, the signal processing system of the image signals output from the camera can be verified.

BRIEF DESCRIPTION OF THE DRAWINGS

FIG. 1 is a block diagram of an embodiment of the digital still camera according to the present invention;

FIGS. 3A and 3B show a change of indication in indication area C during a reproduction standby;

FIGS. 6A and 6B are flow charts that continues from FIGS. 5A and 5B;

FIG. 9 is a flow chart showing the photography-related information switching processing that the control circuit performs during reproduction;

FIGS. 11A-11D show changes of indication of photography-related information displayed on the monitor;

DESCRIPTION OF THE PREFERRED EMBODIMENT

Figure 2A:
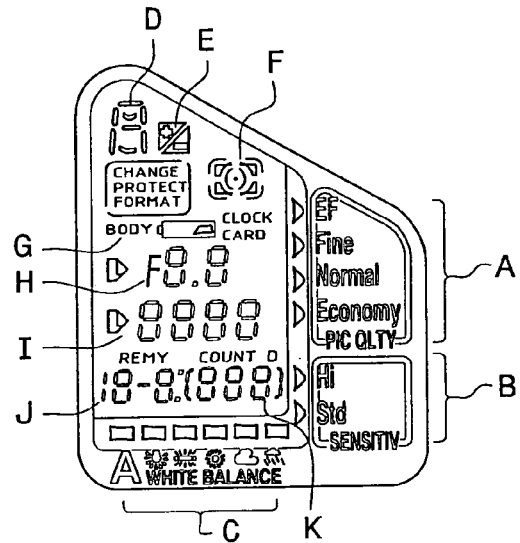
FIGS. 2A-2C show the contents of indications displayed on the indicating device.

Following is an explanation of an embodiment of a digital still camera according to the present invention in reference to FIGS. 1-14. FIG. 1 is a block diagram of the embodiment of the digital still camera according to the present invention. In FIG. 1, the light flux of a photographic subject that has passed through a photographic lens 1 is then induced to a diaphragm 2. Reference number 3 indicates a quick return mirror (hereafter referred to as the mirror) which lets the light flux of the photographic subject that has passed through the diaphragm 2 pass and also reflects the light flux from the photographic subject. The part of the light flux that is reflected by the mirror 3 is led to a multi-divided SPD (Silicon Photo Diode) 4 and the light flux that has passed the mirror 3 is led to a shutter 5. The multi-divided SPD 4 is constituted of a plurality of photometric elements and performs photometry on the photographic field divided into a plurality of areas. The output of each photometric element is amplified by a photometric amplifier 6.

Reference number 7 indicates an diaphragm drive device for controlling the stop quantity of the diaphragm 2 and reference number 8 indicates a shutter drive circuit for controlling opening and closing of the shutter 5. Reference number 9 indicates a CCD, which receives the light flux of the photographic subject while the shutter 5 is opening, accumulates a signal charge that corresponds to the quantity of light received and outputs the accumulated signal charge as image data. Reference number 10 indicates a CCD drive circuit that controls the charge accumulation and charge transfer performed by the CCD 9. Reference number 11 indicates a signal processing circuit that performs correction processing including white balance adjustment, γ correction and outline correction for the image data output from the CCD 9. Reference number 12 indicates a compression circuit that compresses the image data for which correction processing has been performed in the signal processing circuit 11 and the compressed data are then stored on a memory card 13.

Reference number 14 indicates a control circuit that controls the diaphragm drive device 7, the shutter drive circuit 8 and the CCD drive circuit 10. Reference number 15 indicates an indicating device that displays various types of information necessary for photographing and reproduction, which may be provided, for instance, on the upper surface of the camera. Reference number 16 indicates a power supply switch that switches between supplying and not supplying a source voltage to various parts of the camera. Reference number 17 indicates a first position switch that is turned ON when the release button (not shown) is pressed halfway down and reference number 18 indicates a second position switch which is turned ON when the release button is pressed all the way down. Reference number 19 indicates a photographing/reproducing selection switch that selects either the photographing mode for photographing or the reproducing mode for performing reproduction. Reference number 20 indicates a pulse generator that outputs a pulse signal every time a command dial (not shown) is rotated by a specific quantity. Reference number 21 indicates a sensitivity changeover switch that switches the sensitivity of the CCD 9. Reference number 22 indicates a photometry mode changeover switch for switching to and from the photometry mode. Reference number 23 indicates an exposure correction changeover switch for switching exposure correction quantities, and reference number 24 indicates an image signal conversion circuit that converts the photographic image data stored on the memory card 13 to image signals. The image signal conversion circuit 24 outputs image signals in either the NTSC system or PAL system as detailed later. Reference number 25 indicates a photographing mode changeover switch for switching among various photographing modes (program mode, diaphragm priority mode, shutter priority mode, etc.).

Figure 2B:
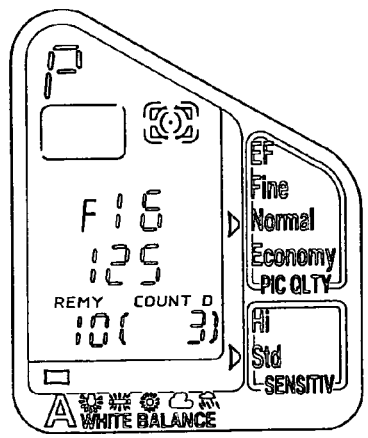

FIGS. 2A-2C, 3A and 3B, and 4A-4F show the details of indications displayed on the indicating device 15. FIG. 2A shows the indication that has lighted up elements in all the indication areas and FIG. 2B shows the indication displayed when the photographing mode is being selected. In FIG. 2A the compression mode is displayed in the indication area A, the sensitivity of the CCD 9 while photographing is indicated in the indication area B, the mode that is set for the white balance is indicated in the indication area C, the exposure mode is indicated in the indication area D and the presence or absence of exposure correction is indicated in the indication area E. Furthermore, the photometry mode is indicated in the indication area F, the battery capacity in the indication area G, the aperture value in the indication area H, the shutter speed in the indication area I, the number of frames remaining that can be recorded on the memory card 13 is indicated in the indication area J and the frame number of the photographic frame for the next photograph is displayed in the indication area K.

Figure 2C:
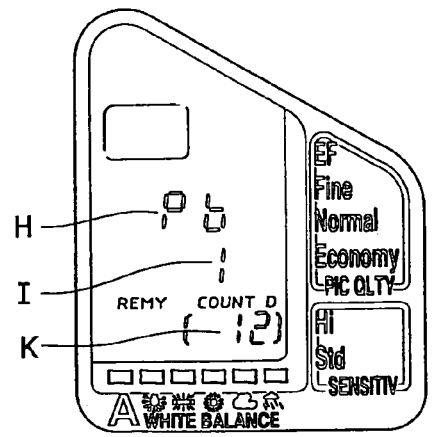
Figure 4:
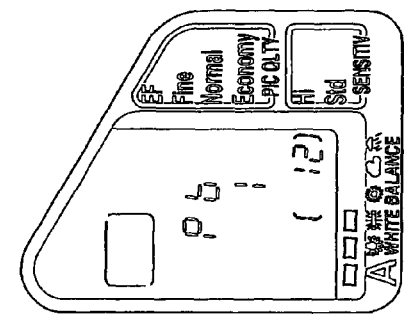
FIGS. 4A-4F show changes of indication in indication area C during reproduction.
Figure 4:
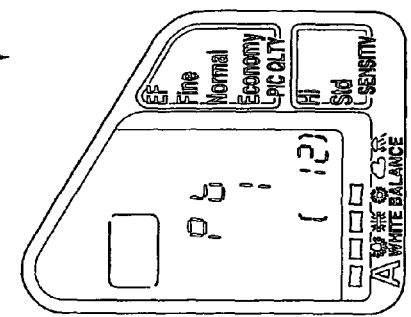
Figure 4:
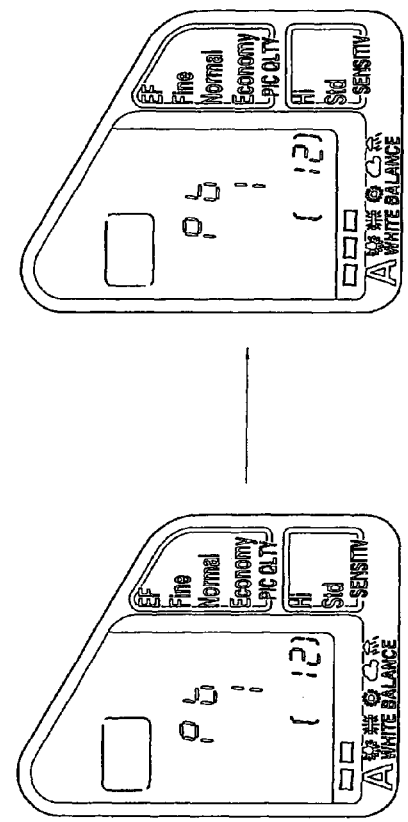
Figure 4:
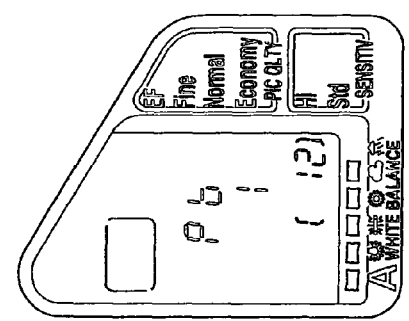
Figure 4:
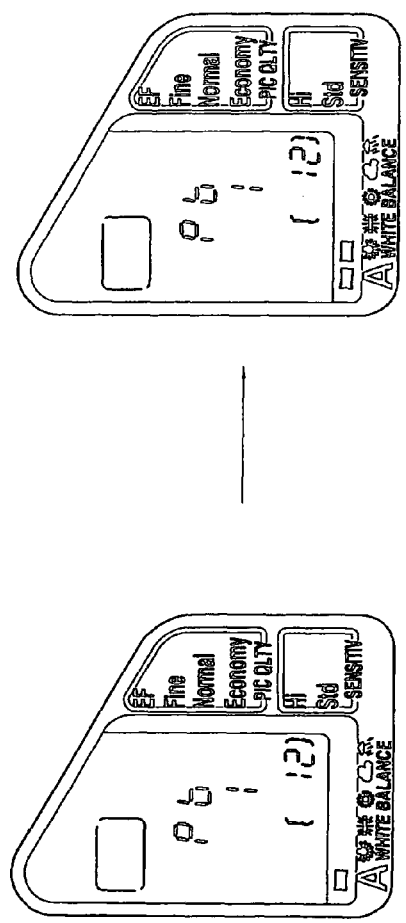
Figure 4:
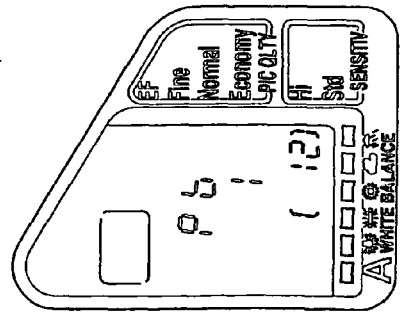
Figure 5A:
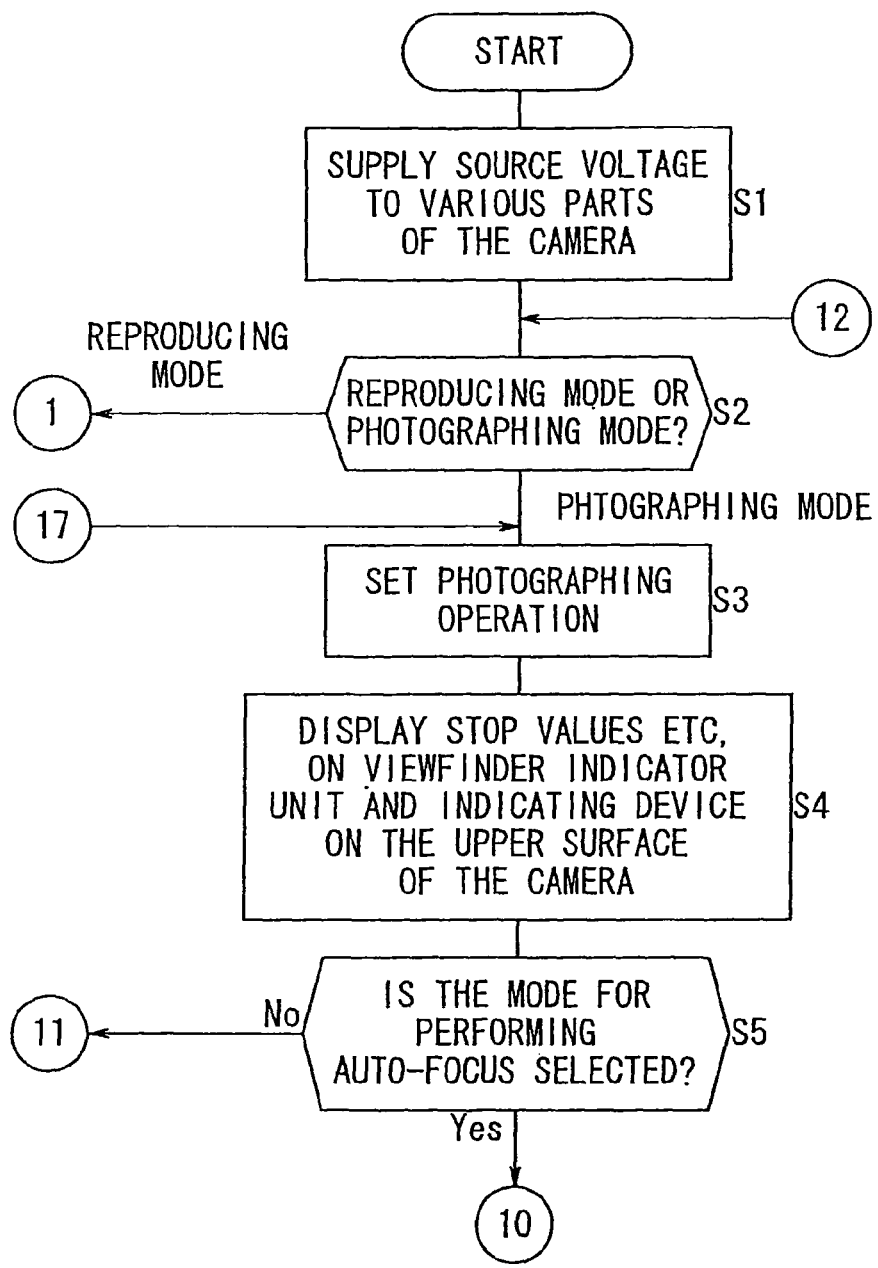
FIGS. 5A and 5B are flow charts illustrating the processing operations performed by the control circuit.
Figure 5B:
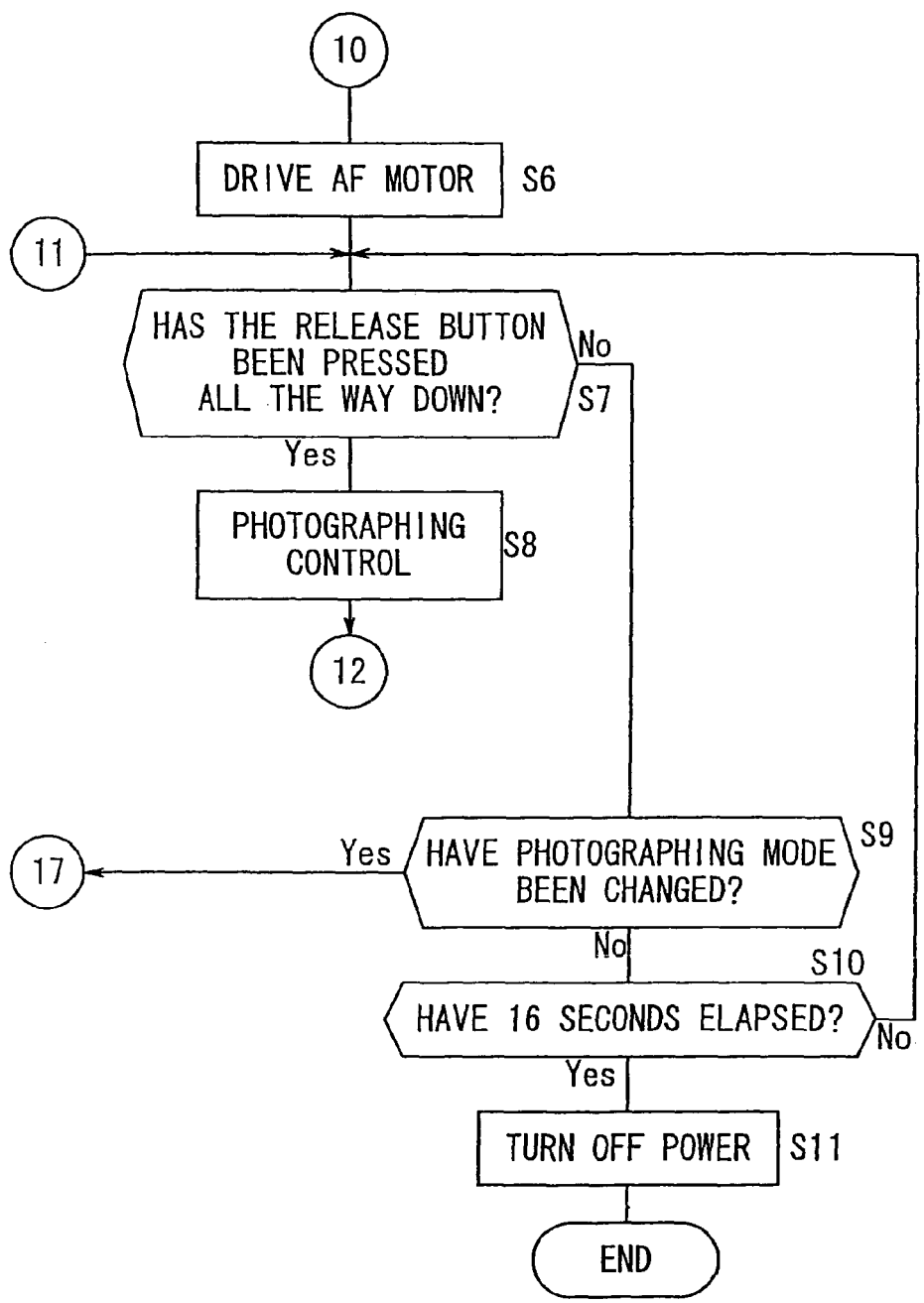
Figure 6B:
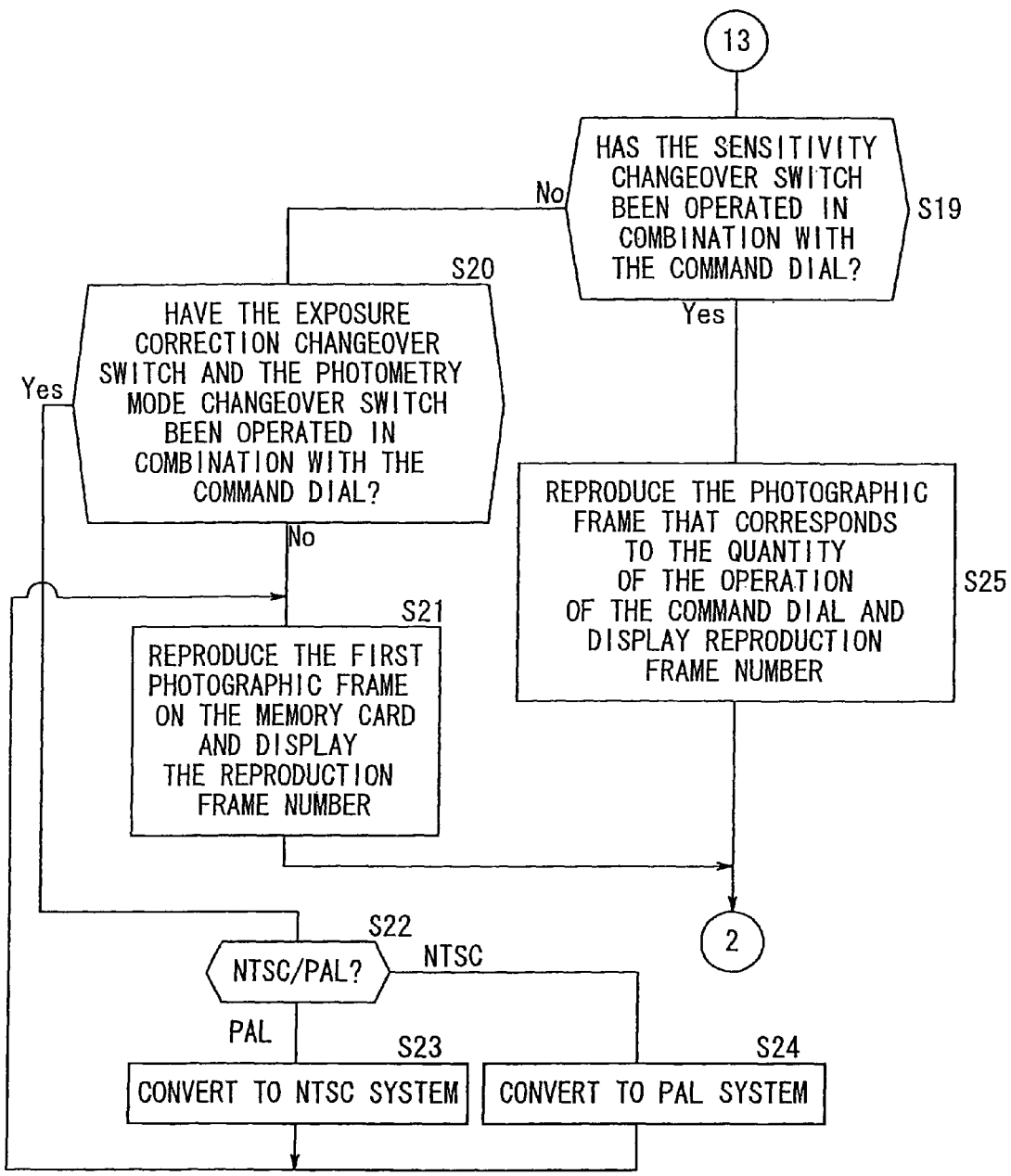
Figure 7A:
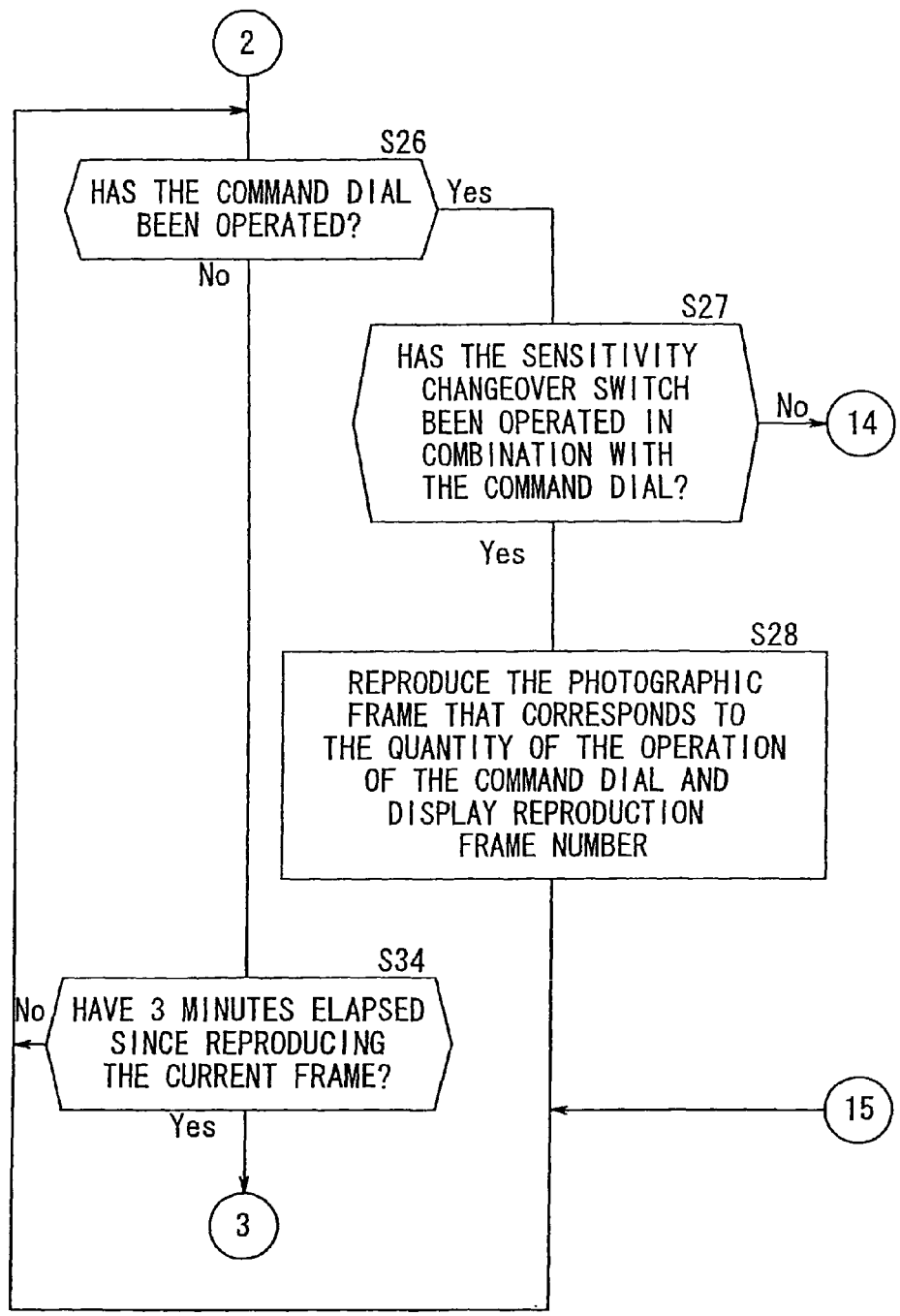
FIGS. 7A and 7B are flow charts that continues from FIGS. 6A and 6B.
Figure 7B:
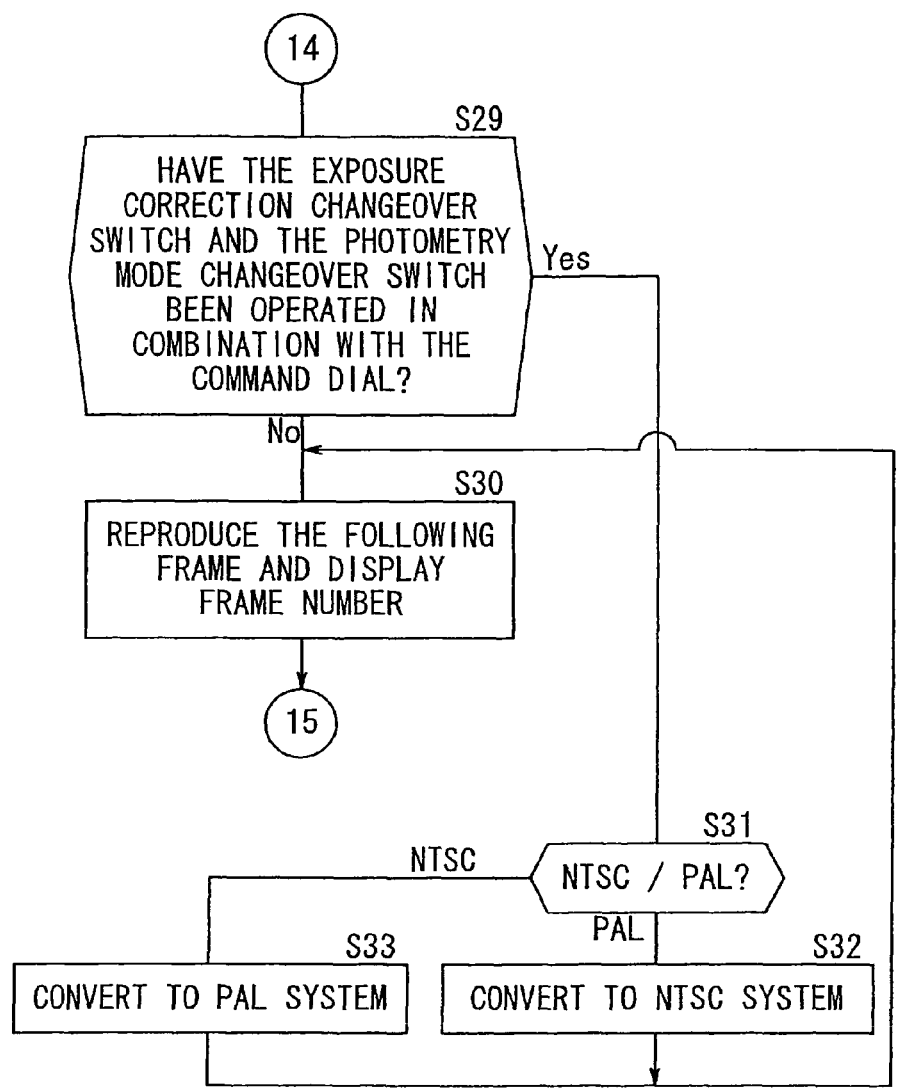
Figure 8A:
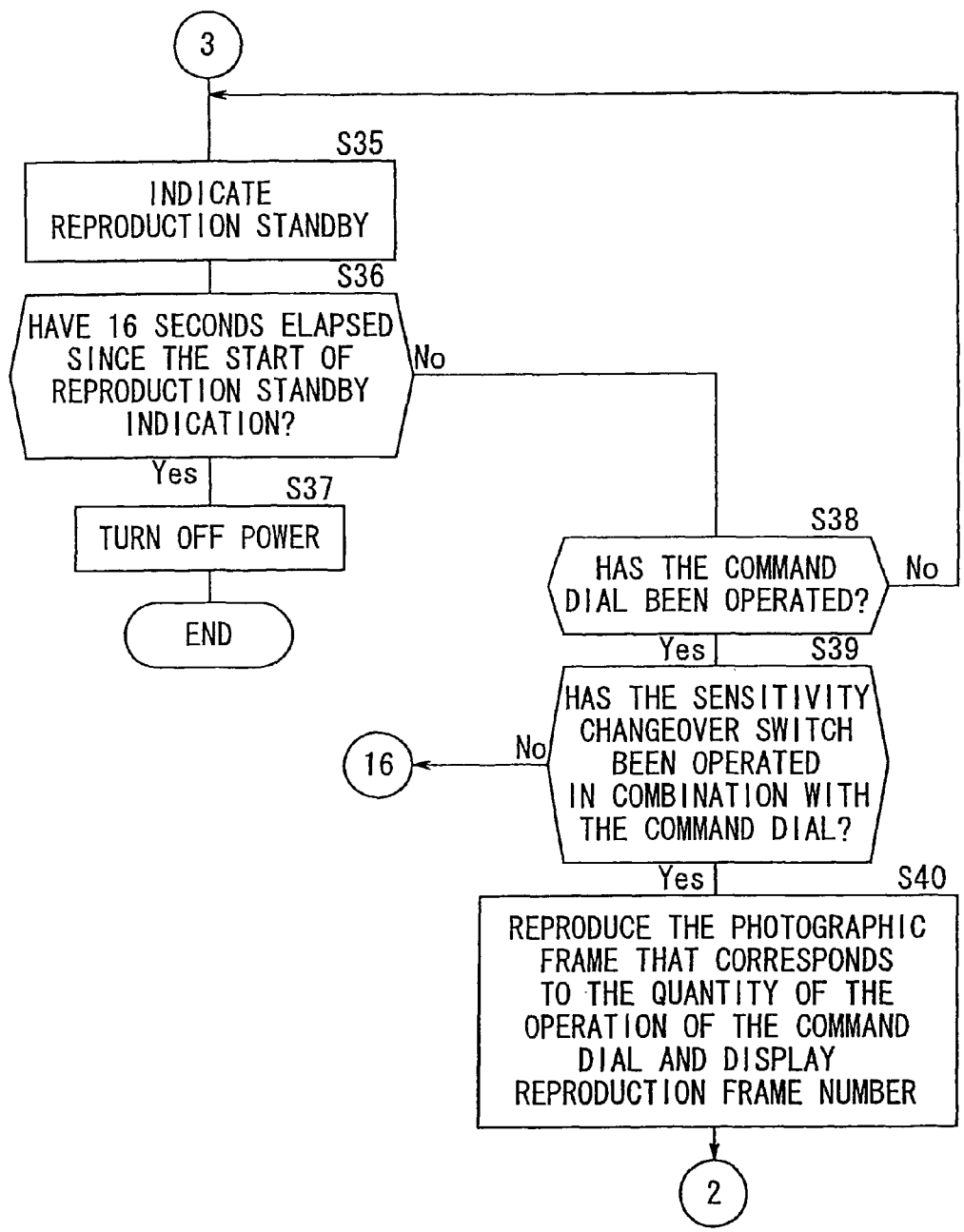
FIGS. 8A and 8B are flow charts that continues from FIGS. 7A and 7B.
Figure 8B:
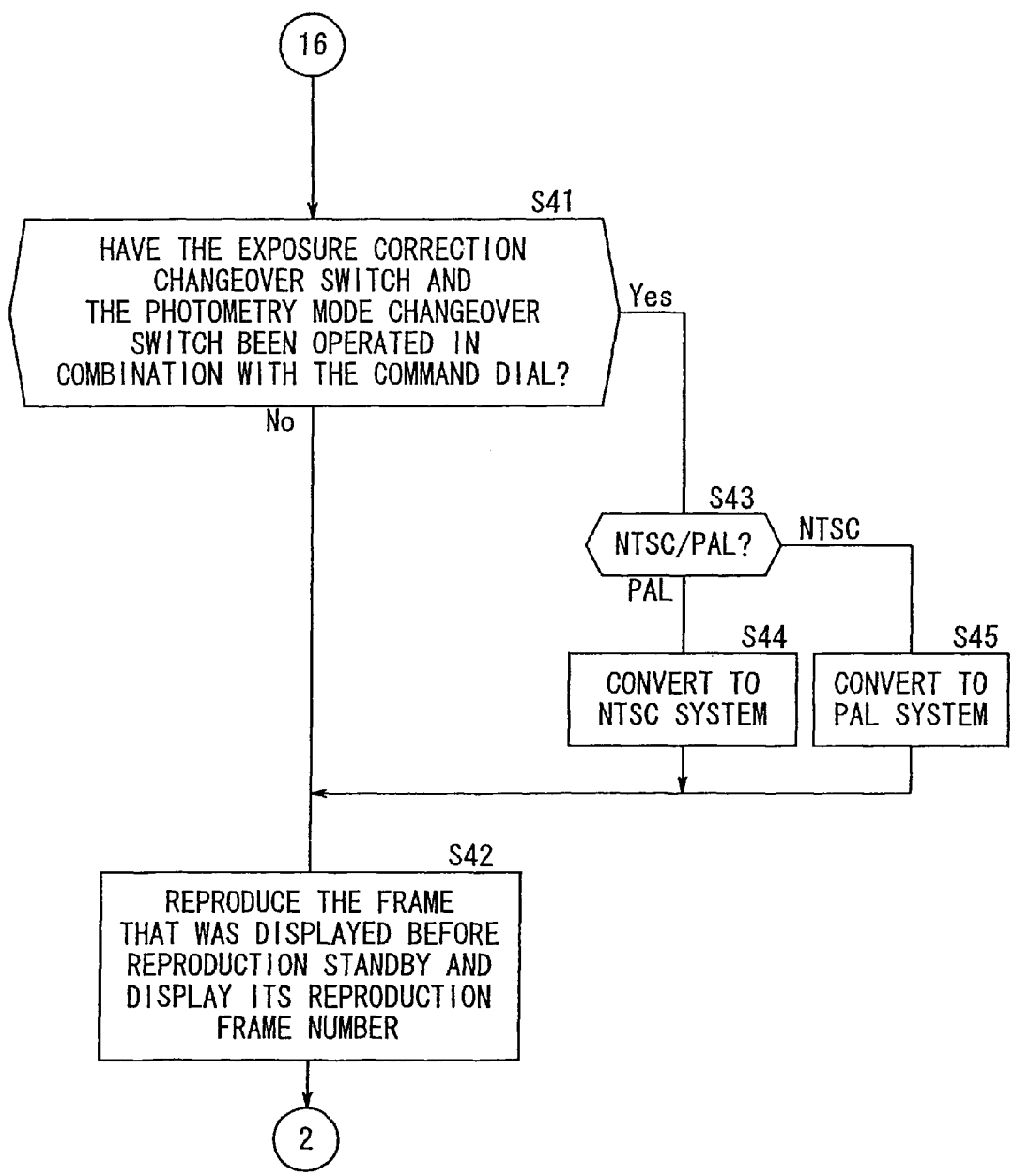

FIG. 2C shows the contents of the indication displayed on the indicating device 15 when the reproducing mode is selected. As shown in the figure, the letters "Pb", indicating that the reproducing mode is set are displayed in the indication area H, the frame number of the frame data currently being reproduced is displayed in the indication area I, and the total number of photographic frames that have recorded on the memory card 13 is displayed in the indication area K. Note that, the contents of the indication displayed in the indication area C varies depending upon whether the operation is in standby for reproduction or reproduction is in progress.

FIGS. 3A and 3B show the change in indication in the indication area C during a reproduction standby and FIGS.

4A-4F show change in indication in the indication area C during reproduction. The indications in the indication area C during reproduction standby switch at high speed as follows; FIG. 3A→FIG. 3B→FIG. 3A . . . . The indications in the indication area C during reproduction, on the other hand, switch sequentially at a lower speed as follows; FIG. 4A→FIG. 4B→FIG. 4C→FIG. 4D→FIG. 4E→FIG. 4F→FIG. 4A . . . .

As a result, in this embodiment according to the present invention, since the indication formats in the indication area C alternate with changes between reproduction and reproduction standby, identification as to whether reproduction is currently in progress or the operation is in standby for reproduction is facilitated. This makes it possible for the photographer to verify with the indication on the indicating device 15 whether or not image signals are being output from the camera to the monitor.

FIGS. 5A-8B are flow charts illustrating the processing performed in the control circuit 14. The following is an explanation of the operation of the embodiment in reference to the flow chart. Note that the control circuit 14 starts the processing shown in FIGS. 5A-8B when the release button is pressed halfway down. In step S1 in FIG. 5A, the source voltage is applied to the various parts of the camera. With this, the initial picture plane is displayed on the indicating device 15 on the upper surface of the camera and on the viewfinder indicator unit (not shown). In step S2, a decision is made as to whether the reproducing mode or the photographing mode has been selected with the photographing/reproducing selection switch 19.

If the photographing mode has been selected, the operation proceeds to step S3 in which various settings required for a photographing operation, such as the photometry mode, the sensitivity, the stop value and the shutter speed, are made. In step S4, numerical values representing the stop value, the shutter speed and the like are displayed on the viewfinder indicator unit and the indicating device 15 on the upper surface of the camera. In step S5, a decision is made as to whether or not the mode for implementing autofocusing has been selected. If the decision is affirmative, the operation proceeds to step S6 in which the AF motor is driven to perform processing for detecting focus adjustment information. When the processing in step S6 is completed or, if the decision made in step S5 is negative, the operation proceeds to step S7, in which a decision is made as to whether or not the release button has been pressed all the way down, i.e., whether or not the second position switch 18 has been turned on.

If the decision is affirmative, the operation proceeds to step S8 in which photographing control, including exposure control, shutter control and the like is performed, and the operation proceeds to step S2.

If the decision made in step S7 is negative, the operation proceeds to step S9, in which a decision is made as to whether or not the photographing mode has been changed with operating of any one of the operating members for setting the photographing mode. If the operating member has been operated and the photographing mode has, been changed, the operation returns to step S3 to perform setting for the photographing operation. If the photographing mode has not been changed, the operation proceeds to step S10, in which a decision is made as to whether or not 16 seconds have elapsed since the release button was pressed halfway down. If it has not elapsed, the operation returns to step S7. If 16 seconds have elapsed, the operation proceeds to step S11, in which the supply of the source voltage to the various parts of the camera is stopped, to achieve a reduction in power consumption. If, on the other hand, it is decided in step 2 that the reproducing mode has been selected, the operation proceeds to step S12 shown in FIG. 6A, in which the drive of the AF motor is prohibited to achieve a reduction in power consumption. In step S13, the viewfinder indicator unit is turned off. With this, the photographer can know that photographing is not possible and, at the same time, a reduction in power consumption is achieved. Note that, instead of turning off the viewfinder indicator unit, it may be displayed that the reproducing mode has been selected. However, since the photographer can verify that the reproducing mode has been selected on the display of the indicating device 15 on the upper surface of the camera, in this embodiment, the viewfinder indicator unit is turned off, to reduce power consumption. In step S14, pressing down the release button all the way is prohibited. With this, recording to the memory card 13 in the reproducing mode is reliably prohibited.

When the processing in step S14 is completed, the operation proceeds to step S15, in which the reproduction standby indication is displayed. In other words, as described earlier, the indications in the indication area C are switched rapidly as follows; FIG. 3A→FIG. 3B→FIG. 3A . . . . In step S16, a decision is made as to whether or not the command dial has been operated. In this embodiment, it is decided that the command dial has been operated if a pulse signal is output from the pulse generator 20. If the decision in step S16 is negative, the operation proceeds to step S17, to decide whether or not 16 seconds have elapsed since the start of the reproduction standby indication. If the decision is negative, the operation returns to step S15 but if the decision is affirmative, the operation proceeds to step S18, in which the power to the camera is turned off to end processing.

If the decision in step S16 is affirmative, the operation proceeds to step S19, in which a decision is made as to whether or not the sensitivity changeover switch 21 has been operated in combination with the command dial. If the decision is negative, the operation proceeds to step S20, in which a decision is made as to whether or not the exposure correction changeover switch 23 and the photometry mode changeover switch 22 have been operated in combination with the command dial. If the decision is negative, the operation proceeds to step S21, in which the first photographic frame recorded on the memory card 13 is reproduced on an external monitor and also, the indications on the indicating device 15 are changed. To be more specific, as shown in FIG. 2C, the letters "Pb", indicating that reproduction is in progress are displayed in the indication area H, with "1" in the indication area I indicating that the first photographic frame is being reproduced and "12" in the indication area K indicating that the total number of frames recorded on the memory card 13 is twelve. Also, by changing the indications in the indication area C sequentially as follows, FIG. 4A→FIG. 4B→FIG. 4C→FIG. 4D→FIG. 4E→FIG. 4F→FIG. 4A . . . , it is indicated that reproduction is in progress.

If, on the other hand, the decision in step S20 is affirmative, the operation proceeds to step S22, in which a decision is made as to whether the current reproduction system is the NTSC system or the PAL system. If the current reproduction system is PAL system, the operation proceeds to step S23 to change it to NTSC system and if the current reproduction system is NTSC system, the operation proceeds to step S24 to change it to PAL system. When the processing in step S23 or S24 ends, the operation returns to step S21.

If the decision in step S19 is affirmative, the operation proceeds to step S25, in which the frame number of the photographic frame for the reproduction, which corresponds to the quantity of operation of the command dial, is displayed on the indicating device 15, and this photographic frame is displayed on the external monitor. When the processing in step S21 or S25 ends, the operation proceeds to step S26 shown in FIG. 7A, in which a decision is made as to whether or not the command dial has been operated. If an affirmative decision is made, the operation proceeds to step S27, in which a decision is made as to whether or not the sensitivity changeover switch 21 has also been operated in combination with the command dial. If the decision is affirmative, the operation proceeds to step S28, in which the frame number of the photographic frame for reproduction, which corresponds to the quantity of operation of the command dial, is displayed and this photographic frame is reproduced on the external monitor. If a negative decision is made in step S27, the operation proceeds to step S29, in which a decision is made as to whether or not the exposure correction changeover switch 23 and the photometry mode changeover switch 22 have been operated in combination with the command dial. If a negative decision is made, the operation proceeds to step S30, to reproduce the next photographic frame and to indicate its frame number on the indicating device 15. When the processing in step S28 or S30 is completed, the operation returns to step S26.

If, on the other hand, the decision in step S29 is affirmative, the operation proceeds to step S31, in which a decision is made as to whether the current reproduction system is the NTSC system or the PAL system. If the current reproduction system is PAL system, the operation proceeds to step S32 to change it to NTSC system. If the current reproduction system is NTSC system, the operation proceeds to step S33 to change it to PAL system. When the processing in step S32 or S33 ends, the operation returns to step S30.

If a negative decision is made in step S26, the operation proceeds to step S34, in which a decision is made as to whether or not 3 minutes have elapsed since the reproduction of the current photographic frame has been started. If a negative decision is made, the operation returns to step S26 and if an affirmative decision is made, the operation proceeds to step S35 shown in FIG. 8A. In step S35, the reproduction standby indication is made. In step S36, a decision is made as to whether or not 16 seconds have elapsed since the reproduction standby indication has been started. If an affirmative decision is made, the operation proceeds to step S37, in which the power is turned off to end the processing. If a negative decision is made in step S36, the operation proceeds to step S38, in which a decision is made as to whether or not the command dial has been operated. If the decision is negative, the operation returns to step S35 and if the decision is affirmative, the operation proceeds to step S39. In step S39, as in step S27 shown in FIG. 7A, a decision is made as to whether or not the sensitivity changeover switch 21 has been operated in combination with the command dial. If the decision is affirmative, the operation proceeds to step S40, in which the frame number of the photographic frame for the reproduction, which corresponds to the quantity of operation of the command dial, is displayed, and this photographic frame is reproduced. If a negative decision is made in step S39, the operation proceeds to step S41, in which a decision is made as to whether or not the exposure correction changeover switch 23 and the photometry mode changeover switch 22 have been operated in combination with the command dial. If a negative decision is made, the operation proceeds to step S42, in which the frame, the number of which was displayed before the reproduction standby, is reproduced.

If, on the other hand, the decision in step S41 is affirmative, the operation proceeds to step S43, in which a decision is made as to whether or not the signal processing system currently selected for image signals is the NTSC system or the PAL system. If the current image signal processing system is PAL system, the operation proceeds to step S44 to change it to NTSC system and if the current signal system is NTSC system, the operation proceeds to step S45 to change it to PAL system. When the processing in step S44 or S45 ends, the operation returns to step S42.

To summarize the processing illustrated in FIGS. 5A-8B that has been described so far, when the reproducing mode is selected, drive of the AF motor is prohibited and, at the same time, the viewfinder indicator unit is turned off, to reduce power consumption. Also, by ensuring that the release button cannot be pressed all the way down, recording on to the memory card 13 during reproduction is prohibited. Then, the indication to the effect that the operation is in standby for reproduction is displayed on the indicating device 15. If the command dial is not operated even when 16 seconds have elapsed since the indication to the effect that the operation is in standby for reproduction has been started, the supply of the source voltage to the various parts of the camera is stopped, to reduce power consumption. If, on the other hand, the command dial is operated within the 16 seconds, image signals are output to the external monitor and also, an indication to the effect that reproduction is in progress is displayed on the indicating device 15. If the command dial is operated within 3 minutes after reproduction of a given photographic frame has been started, the next photographic frame is also reproduced. If, on the other hand, the command dial is not operated within 3 minutes, the indication to the effect that the operation is in standby for reproduction is redisplayed.

In addition, if the sensitivity changeover switch 21 and the command dial are operated at the same time during reproduction or during standby for reproduction, the photographic frame to be reproduced is determined in correspondence to the quantity and direction of the rotation of the command dial and the frame number of the frame thus determined is displayed on the indicating device 15. Furthermore, if the exposure correction changeover switch 23 and the photometry mode changeover switch 22 are operated at the same time during the operation of the command dial, the signal processing system of image signals is switched.

As has been explained, with the processing described in reference to in FIGS. 5A-8B, various settings for reproduction are made by using the command dial and the sensitivity changeover switch 21, which are originally provided for setting information related to photographing, thereby eliminating the necessity of adding new operating members and making it possible to use a camera body of the prior art as it is. In addition, if the command dial is not operated within 3 minutes after a given photographic frame has been reproduced, the operation automatically enters the reproduction standby state and if the command dial is not operated within 16 seconds after the operation enters the reproduction standby state, the power is automatically turned off, resulting in a reduction in power consumption.

Furthermore, when the reproducing mode is selected, the frame number of the frame data that is currently being reproduced or which is to be reproduced, and the total number of photographic frames recorded on the memory card 13 are always displayed on the indicating device 15. Therefore, the photographer can be apprised of which photographic frame is being reproduced currently and also of the remaining number of photographic frames that can be recorded on the memory card 13, achieving effective use of the memory card 13. Moreover, since the signal processing system of image signals output from the camera is changed in correspondence to the type of the monitor connected to the camera, different types of monitors can be connected to one camera with no problem.

Figure 10:
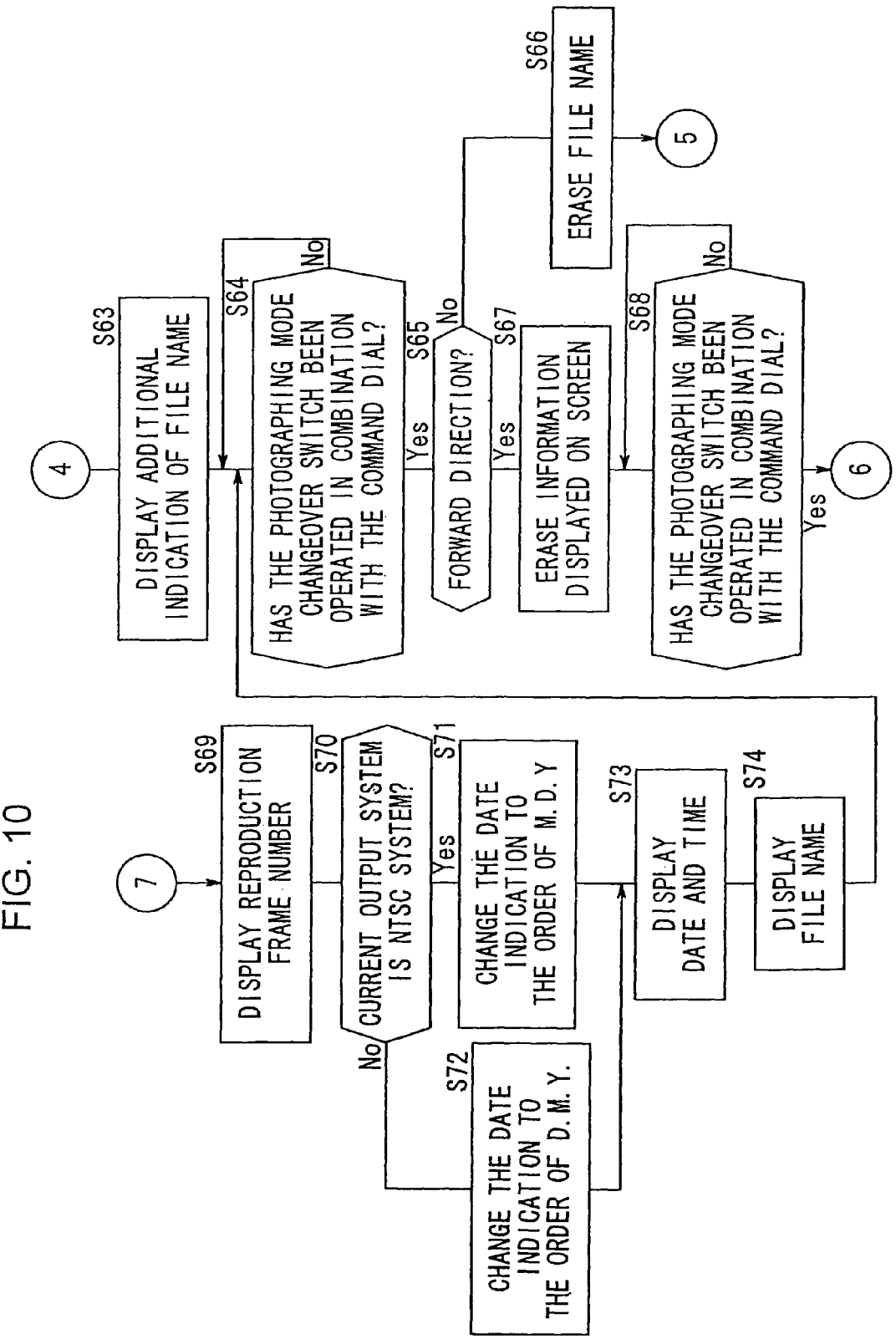
FIG. 10 is a flow chart that continues from FIG. 9.

FIGS. 9 and 10 are flow charts illustrating the photography-related information switching processing performed by the control circuit 14 when the command dial is rotated at the same time as the photographing mode changeover switch 25 is operated during reproduction of the photographic frame data. FIGS. 11A-11D show the change in photography-related information displayed on the monitor. When reproduction of the photographic frame data has been started, the photography-related information is not displayed on the monitor, as shown in FIG. 11A, and then, later, when the photographer rotates the command dial at the same time as he operates the photographing mode changeover switch 25, the control circuit 14 starts the processing shown in FIG. 9. In step S51 shown in FIG. 9, a decision is made as to whether or not the command dial has been rotated in the forward direction (the clockwise direction, for instance). If the command dial has been operated in the forward direction, the operation proceeds to step S52, in which the frame number of the frame for reproduction is displayed on the monitor, as shown in FIG. 11B. In step S53, a decision is made again as to whether or not the command dial has been rotated at the same time as the operation of the photographing mode changeover switch 25. If an affirmative decision is made, the operation proceeds to step S54, in which a decision is made as to whether or not the command dial has been rotated in the forward direction. If it is decided that it has been rotated in the reverse direction, the operation proceeds to step S55, in which the frame number of the frame data for reproduction, which is on display on the monitor, is erased. And the operation returns to step S51.

If, on the other hand, it is decided in step S54 that the command dial has been operated in the forward direction, the operation proceeds to step S56, in which a decision is made as to whether or not the image signal processing system that is currently selected is the NTSC system. If the NTSC system is selected, the operation proceeds to step S57, in which the order in which the date information is displayed is set to Month→Day→Year. If, on the other hand, it is decided in step S56 that the NTSC system is not selected, the operation proceeds to step S58, in which the order in which the date information is displayed is set to Day→Month→Year. When the processing in step S57 or S58 ends, the operation proceeds to step S59, in which the date information and the time information are displayed in addition to the frame number of the frame data for reproduction, as shown in FIG. 11C.

In step S60, a decision is made again as to whether or not the command dial has been rotated at the same time as the operation of the photographing mode changeover switch 25. If the decision is negative, the operation remains in step S60. If an affirmative decision is made, the operation proceeds to step S61, in which a decision is made as to whether or not the command dial has been rotated in the forward direction. If it is decided that the command dial has been rotated in the reverse direction, the operation proceeds to step S62 to erase the date information and the time information that have been on display, and then returns to step S53.

If it is decided in step S61 that the command dial has been rotated in the forward direction, the operation proceeds to S63 shown in FIG. 10, in which the file name is displayed in addition to the reproduction frame number, the date information and the time information, as shown in FIG. 11D.

In step S64 that follows, a decision is made again as to whether or not the command dial has been rotated at the same time as the operation of the photographing mode changeover switch 25. If the decision is negative, the operation remains in step S64. If an affirmative decision is made, the operation proceeds to step S65, in which a decision is made as to whether or not the command dial has been rotated in the forward direction. If it is decided that the command dial has been rotated in the reverse direction, the operation proceeds to step S66 to erase the file name that has been on display, and then returns to step S60. If, on the other hand, it is decided in step S65 that the command dial has been rotated in the forward direction, the operation proceeds to step S67 to erase all the photography-related information that has been on display, and then proceeds to step S68. In step S68, a decision is made again as to whether or not the command dial has been rotated at the same time as the operation of the photographing mode changeover switch 25. If the decision is negative, the operation remains in step S68. If an affirmative decision is made, the operation returns to step S51.

If, on the other hand, it is decided in step S51 shown in FIG. 9, that the command dial has been operated in the reverse direction, the operation proceeds to step S69 shown in FIG. 10. In steps S69-S74, the processing for indicating all of the photography-related information is performed, as shown in FIG. 11D.

In step S69, the reproduction frame number is displayed. Then in step S70, a decision is made as to whether or not the signal system with which signals are output to the monitor is the NTSC system. If the decision is affirmative, the operation proceeds to step S71, and the order in which the date information is displayed is set to Month→Day→Year. If it is decided in step S71 that the current signal system is not the NTSC system the operation proceeds to step S72, in which the order in which the date information is displayed is set to Day→Month→Year. When the processing in step S71 or S72 is completed, the operation proceeds to step S73, in which the date information and the time information are displayed in addition to the reproduction frame number. In the following step S74, the file name of the photographic frame for reproduction is also displayed, and then the operation proceeds to step S64.

In the processing shown in FIGS. 9 and 10 that has been explained so far, when the photographer rotates the command dial while operating the photographing mode changeover switch 25 during reproduction of the photographic frame data, the photography-related information to be displayed on the monitor is changed in correspondence to the quantity and direction of the rotation of the command dial. In other words, in this embodiment, the frame number, the date and the time information relating to the reproduced frame data and the file name of the reproduced frame data are provided as the photography-related information and when the command dial is rotated in the forward direction (the clockwise direction) while the photographing mode changeover switch 25 is operated, the photography-related information display is switched in the order of FIG. 11A→FIG. 11B→FIG. 11C→FIG. 11D→FIG. 11A . . . . In contrast, when the command dial is rotated in the reverse direction (the counter-clockwise direction) while the photographing mode changeover switch 25 is operated, the photography-related information display is switched in the order of FIG. 11A→FIG. 11D→FIG. 11C→FIG. 11B→FIG. 11A . . . .

Figure 12A:
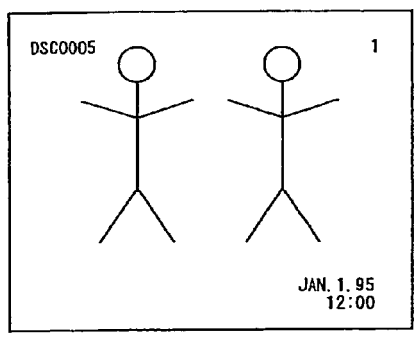
FIGS. 12A and 12B show the different indication formats used to indicate the date in the NTSC system and the PAL system.
Figure 12B:
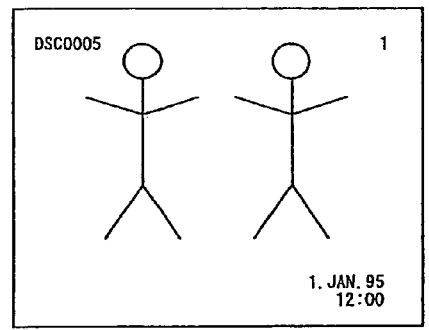

As has been explained, with the combined operation of the photographing mode changeover switch 25 and the command dial, which are originally provided for setting the photographing mode, the photography-related information to be displayed on the monitor can be selected using a camera body of the prior art as it is. In addition, in this embodiment, the order in which the date information is displayed is switched in correspondence to the signal processing system of image signals output from the camera. For instance, when image signals are output in the NTSC system, the date information is displayed in the order of Month→Day→Year as shown in FIG. 12A and when image signals are output in the PAL system, the date information is displayed in the order of Day→Month→Year as shown in FIG. 12B. The indication order is switched with regard to the different customs in the USA and Europe for indicating dates where those different signals processing system are adopted.

In FIG. 11D the file name displayed in the upper left corner of the screen is inherent to a given photographic frame and a name that conforms to the MS-DOS file format, which is a type of OS for personal computers, is automatically assigned. To be more specific, every file name is composed of 7 characters of which the four characters on the right side of the file name are digits, and are assigned numbers that indicate the order in which the frame was recorded on the memory card 13. For instance, the file name "DSC0005" shown in FIG. 11D indicates that these frame data were the fifth photographic frame data to be recorded on the memory card 13. The memory card 13 is provided with an area P for storing the photographic frame data for each photographic frame and an area Q for storing the photography-related information, such as file names and dates (hereafter referred to as management information) for individual frames, and each time a new photographic frame is photographed, new data are recorded in both the areas P and Q. The management information recorded on the memory card 13 may be uploaded to a personal computer via a card reader and the management information thus uploaded can be displayed on a monitor screen connected to the personal computer. For instance, the photographer can display a list of the file names recorded on the memory card 13 on the monitor screen, select a given file from the list and erase the file from the memory card 13.

Figure 13A:
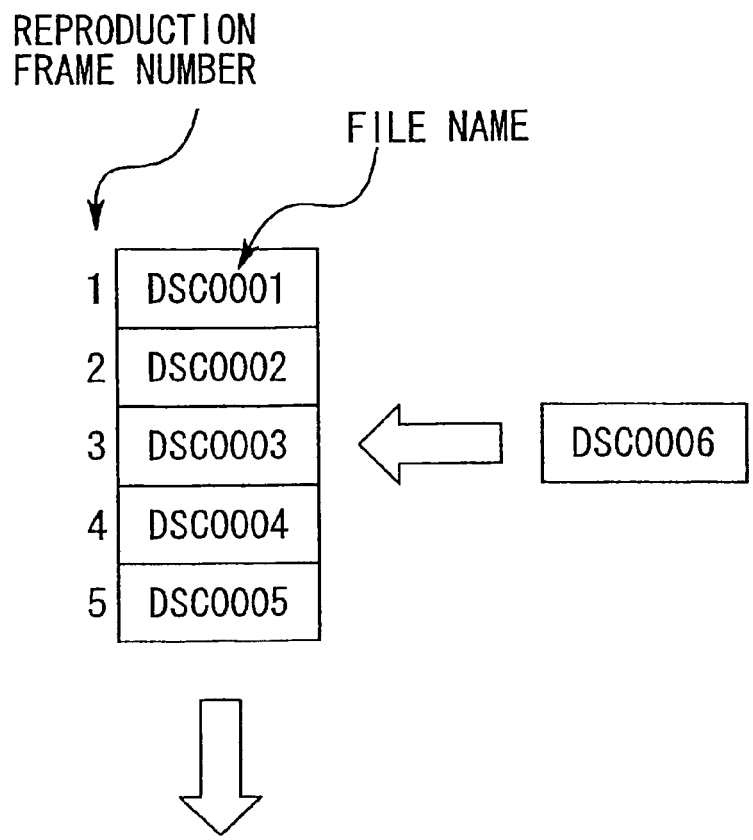
FIGS. 13A and 13B illustrate how file names for photographic frame data, which are stored on the memory card, are assigned.

Note that, when some of the files recorded on the memory card 13 are erased, new photographic frame data may be recorded in the area where the erased files were stored. In that case, file names different from the file names of the erased files are assigned. For instance, FIG. 13A shows an example in which five files "DSC0001"-"DSC0005" are recorded on the memory card 13, then the file "DSC0003" is erased and new photographic frame data are recorded in the area occupied by the erased file. In this case, the file name corresponding to the new photographic frame data is "DSC0006", which is one more than the "DSC0005", which is the file name of the last file recorded on the memory card 13. As is obvious, the last 4 characters in each file name are an identifier which indicates the order of recording in which the photographic frame data has been recorded on the memory card 13. The photographer can ascertain how many times recording and erasure have been repeated on the memory card 13 with the identifier.

Figure 13B:
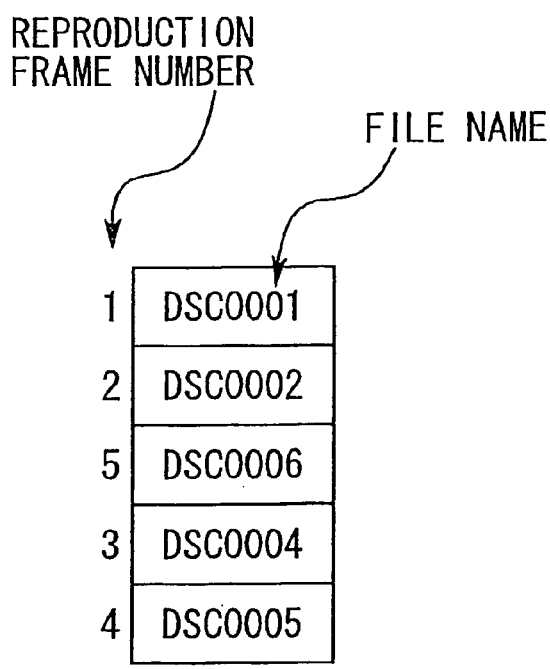
Figure 14:
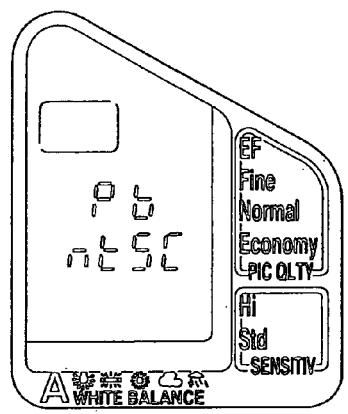
FIGS. 14A and 14B show an example indication on the indicating device when the photometry mode switch and the exposure correction changeover switch are operated at the same time in the reproducing mode.
Figure 14:
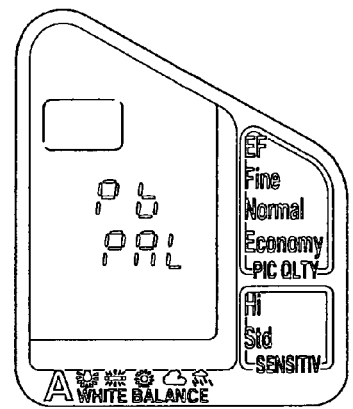

The reproduction frame number that is displayed in the upper right corner of the screen in FIG. 11D indicates the order of reproduction assigned on the memory card 13. In this embodiment, since reproduction is performed in the order in which the photographic frames are recorded on the memory card 13, i.e., the file with smaller number in the last 4 characters in the file name is earlier reproduced than the file with larger number. For instance, when the file "DSC0006" shown in FIG. 13A is reproduced, the number "5" will be displayed. FIG. 13B shows the relation between the file names and the reproduction frame numbers.

However, when erasure and re-recording are repeated on the memory card 13, the order in which the files are reproduced and the order in which they are recorded on the memory card 13 become inconsistent. Because of this, if, for instance, only the reproduction frame number is displayed, there is a likelihood that this number would be mistaken for the number of the order in which this photographic frame was recorded on the memory card 13. To deal with this problem, in this embodiment, the indication given in the upper right corner of the screen ensures that the reproduction frame number can be verified and with the indication of the file name displayed in the upper left corner of the screen the order in which it was recorded on the memory card 13 can be verified. In addition, by indicating the file name, it is possible to erase the file by specifying the file name on the personal computer.

Another feature of this embodiment is that when the photometry mode changeover switch 22 and the exposure correction changeover switch 23 have been operated in combination while photographic frame data are being reproduced, the information that indicates the signal processing system of the image signals is displayed on the indicating device 15 for the duration of the combined operation. FIGS. 14A and 14B shows a examples of indication displayed on the screen of the indicating device 15 while the photometry mode changeover switch 22 and the exposure correction changeover switch 23 have been operated in combination. FIG. 14A shows an example in which image signals in the NTSC system are output and FIG. 14B shows an example in which image signals in the PAL system are output.

As has been explained, since, in this embodiment, the current signal system of image signals can be indicated on the indicating device 15, it can be verified in advance whether or not the signal system matches the type of the monitor that is set.

While in this embodiment, an example in which the memory card 13 is used for the recording medium is explained, a recording medium other than the memory card 13, such as a floppy disk or an optical disk may be used as well. In addition, while in the embodiment an example in which the NTSC system and the PAL systems are switched from one to the other has been explained, any other signal systems may be likewise switched. Although in the embodiment described so far, various functions for reproduction are switched using the command dial, the sensitivity changeover switch 21 and the like, the switches that may be used for switching various functions are not limited those explained in the embodiment above. In other words, any switches may be used as long as they are provided in the camera originally for setting information related to photographing. While in the embodiment above, the indication in regard to the reproducing mode is made on the indicating device 15 which is already provided on the upper surface of the camera, this indication related to the reproducing mode may be made on an indicating device provided at a location other than the upper surface, i.e., the rear surface of the camera for instance. In addition, while in the embodiment above, when selecting various reproduction functions the operation of a plurality of operating members in combination is used as a condition for selection, those operating members do not have to be operated at the same time. The condition may be set such that a plurality of operating members are operated in some form of combination within a specific period of time, for instance, to select the reproduction functions.

What is claimed is:

1. An electronic still camera, comprising:
    an imaging device that outputs image data relating to a photographed subject image,
    a recording device that converts the image data to compressed digital data and records the compressed digital data to a recording medium that exists within the camera, a signal processing method selecting operation device that outputs a control signal to select one signal processing method, from among multiple signal processing methods including at least an NTSC method and a PAL method, as a signal processing method when the compressed digital data is output to an external monitor from the camera, an output circuit that converts the compressed digital data recorded by the recording device to a video signal corresponding to the signal processing method that corresponds to the control signal, and outputs the video signal to the external monitor, a display device that displays an established shooting condition, and a display control circuit that displays the shooting condition during shooting and controls the display device so that the currently selected signal processing method, instead of the shooting condition, is identifiably displayed when the selecting operation of the signal processing method by the signal processing method selecting operation device takes place during non-shooting.

2. The electronic still camera according to claim 1, wherein the display control circuit controls the display device so that a first display that displays the shooting condition and a second display that displays the signal processing method are displayed in a same position in a different manner.

3. The electronic still camera according to claim 1, wherein the display control circuit controls the display device so as to display the signal processing method while the signal processing method selecting operation takes place.

4. The electronic still camera according to claim 2, wherein the display control circuit controls the display device so as to display the signal processing method while the signal processing method selecting operation takes place.

5. The electronic still camera according to claim 1, wherein the shooting condition is established by an operation of the signal processing method selecting operation device.

6. The electronic still camera according to claim 2, wherein the shooting condition is established by an operation of the signal processing method selecting operation device.

7. The electronic still camera according to claim 3, wherein the shooting condition is established by an operation of the signal processing method selecting operation device.

8. The electronic still camera according to claim 1, wherein the recording medium is a memory card capable of recording multiple compressed digital data.

9. The electronic still camera according to claim 2, wherein the recording medium is a memory card capable of recording multiple compressed digital data.

10. The electronic still camera according to claim 3, wherein
the recording medium is a memory card capable of recording multiple compressed digital data.

11. The electronic still camera according to claim 5, wherein
the recording medium is a memory card capable of recording multiple compressed digital data.

12. The electronic still camera according to claim 1, wherein
the output circuit outputs the video signal along with a corresponding frame number.

13. The electronic still camera according to claim 2, wherein
the output circuit outputs the video signal along with a corresponding frame number.

14. The electronic still camera according to claim 3, wherein
the output circuit outputs the video signal along with a corresponding frame number.

15. The electronic still camera according to claim 5, wherein
the output circuit outputs the video signal along with a corresponding frame number.

16. The electronic still camera according to claim 8, wherein
the output circuit outputs the video signal along with a corresponding frame number.

* * * * *